United States Patent
Papageorgiou

(10) Patent No.: US 9,767,463 B2
(45) Date of Patent: Sep. 19, 2017

(54) ON DEMAND PRODUCT PLACEMENT

(75) Inventor: Antonio Papageorgiou, Bronx, NY (US)

(73) Assignee: CFPH, LLC, New York, NY (US)

(*) Notice: Subject to any disclaimer, the term of this patent is extended or adjusted under 35 U.S.C. 154(b) by 2454 days.

(21) Appl. No.: 12/128,154

(22) Filed: May 28, 2008

(65) Prior Publication Data

US 2008/0301224 A1    Dec. 4, 2008

Related U.S. Application Data

(60) Provisional application No. 60/940,590, filed on May 29, 2007.

(51) Int. Cl.
*G06Q 30/00* (2012.01)
*G06Q 30/02* (2012.01)

(52) U.S. Cl.
CPC .................... *G06Q 30/02* (2013.01)

(58) Field of Classification Search
CPC ............. G06Q 40/00; G06Q 30/0241; G06Q 30/0245; G06Q 30/0246; G06Q 30/0247; G06Q 30/0251
USPC .................. 705/14.4, 14.49, 14.72
See application file for complete search history.

(56) References Cited

U.S. PATENT DOCUMENTS

| | | | |
|---|---|---|---|
| 6,490,432 B1 | 12/2002 | Wegener et al. | |
| 7,689,062 B2* | 3/2010 | Baharav et al. | 382/282 |
| 7,765,326 B2* | 7/2010 | Robbin et al. | 709/248 |
| 2003/0028432 A1 | 2/2003 | Troyansky et al. | |
| 2006/0282319 A1 | 12/2006 | Maggio | |

OTHER PUBLICATIONS

International Search Report and Written Opinion of the International Searching Authority, International Application No. PCT/US08/65071, filed May 29, 2008, mail date Aug. 15, 2008, 7 pp.

* cited by examiner

*Primary Examiner* — Lalita M Hamilton

(57) ABSTRACT

In at least one aspect, methods and corresponding systems are provided herewith for mixing media and advertising content on demand. The systems preferably include at least one computing device coupled over a communication network to a plurality of other devices. The at least one computing device is preferably operable at least to: receive a request for media content from a user of a device, retrieve a media file associated with the media content requested and product placement data, and mix the media file with product placement data such that the product placement appears in the media content disposed in at least a portion of a defined null space within the media file.

24 Claims, 2 Drawing Sheets

ON DEMAND PRODUCT PLACEMENT

RELATED APPLICATION

This application claims the benefit of U.S. Application No. 60/940,590 filed May 29, 2007.

BACKGROUND OF THE INVENTION

The present application generally relates to systems and methods for distributing media and advertising content to remote devices.

SUMMARY OF THE INVENTION

In at least one aspect, methods and corresponding systems are provided herewith that comprise at least one computing device coupled over a communication network to a plurality of other devices, the at least one computing device operable at least to: receive a request for media content from a user of a first device; receive a request for the media content from a user of a second device; retrieve a media file associated with the media content requested by the first and the second users, wherein the media content comprises a defined null space; retrieve data for a first and second product placement; mix in response to the request from the user of the first device the media file and the data for the first product placement such that the first product placement appears in the media content disposed in at least a portion of the defined null space; mix in response to the request from the user of the second device the media file and data for the second product placement such that the second product placement appears in the media content disposed in at least a portion of the defined null space; communicate the media content with the first product placement data to the user of the first device; and communicate the media content with the second product placement data to the user of the second device.

In at least one embodiment, the at least one computing device is further operable to mix the media file and the product placement data, and communicate the mixed content to users in real time.

In at least one embodiment, the at least one computing device is further operable to determine demographic data associated with at least one of the user of the first device and the user of the second device and select at least one of the first product placement and the second product placement based on the demographic data.

The first product or the second product placements may be in a banner advertisement or an image of a product. The media content may be a still image or a video image, where the null space comprises at least one defined area of a plurality of frames of the video over a period of time.

In at least one embodiment, the at least one computing device is further operable to conform the image of the product to the null space. In at least one embodiment, operability to conform the product to the null space consists at least two of expanding, cropping, rotating, panning, zooming in or out, transforming the image, skewing and tilting the image. The null space may comprise a plurality of areas of a plurality of consecutive frames of the video, in which instance, the at least one computing device is further operable to conform the image of the product into each of the plurality of the areas to simulate movement of the product in the media content.

DETAILED DESCRIPTION OF THE INVENTION

Methods and systems are generally provided herewith for creating and distributing media content with product placements or other advertising disposed flexibly within the media content. The methods and systems disclosed herein may be implemented with various types of media content, including video, audio, or a combination thereof, and in any format, digital, streaming, or otherwise.

Figure 1:
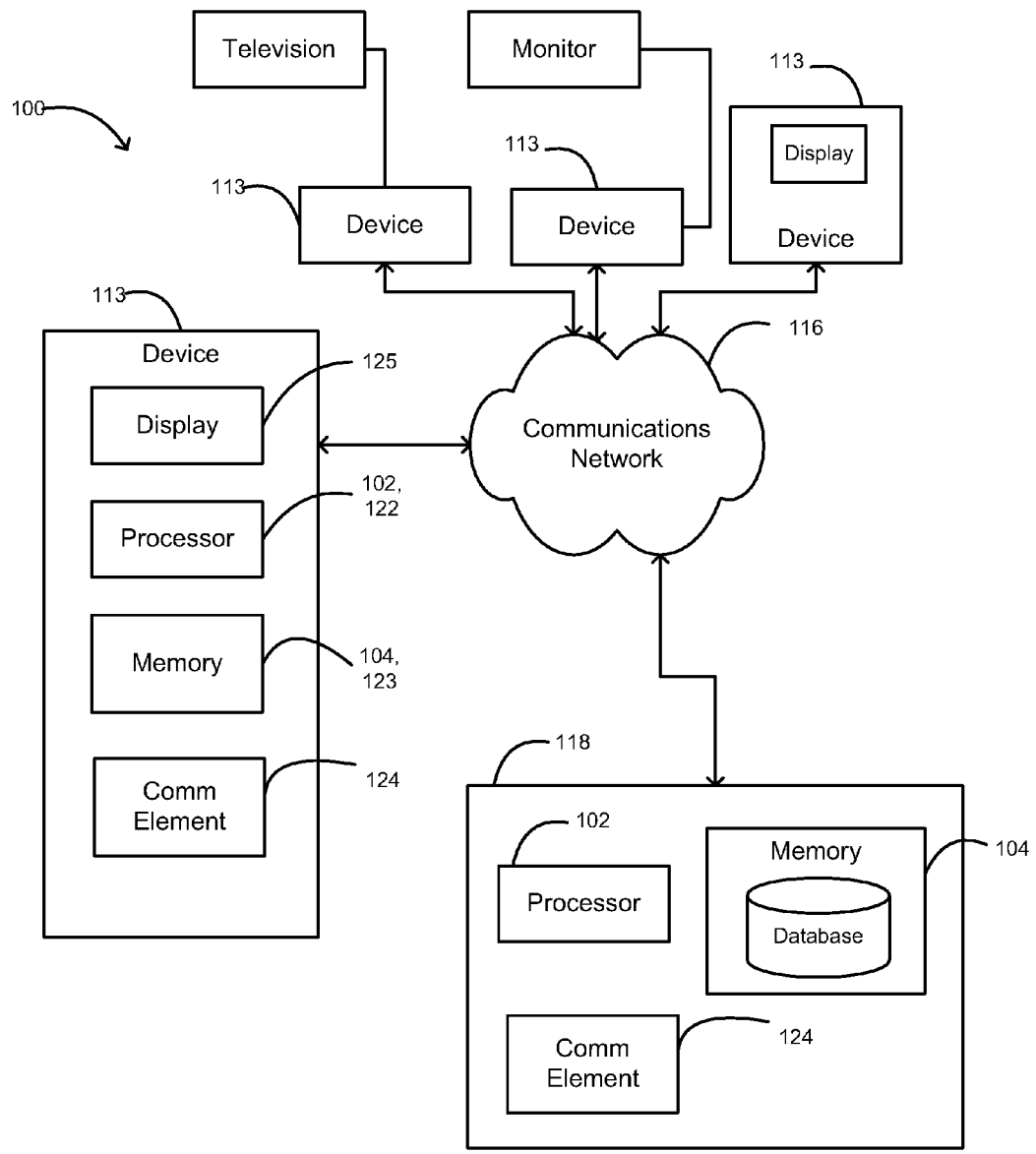
FIG. 1 depicts a system according to at least one embodiment of the systems disclosed herein.

Referring to FIG. 1, a system 100 according to at least one embodiment of the systems disclosed herein includes at least one computing device, such as a remote computer 118, e.g., a server computer, a client device 113, or a combination thereof. The computing device generally includes at least one processor 102, and a memory 104, such as ROM, RAM, FLASH, etc., or any computer readable medium 106, such as a hard drive, a flash-drive, an optical or magnetic disk, etc. The memory 104 or computer readable medium 106 preferably includes software stored thereon that when executed performs one or more steps of the methods disclosed herein, including communicating data back and forth between devices, displaying interface screens, etc. The computing device may also be associated with or have access to one or more databases for retrieving and storing the various types of data discussed herein.

In one embodiment, the system 100 includes a plurality of computing device, such as a remote computer 118 coupled to at least one client or other device 113 over a communication network 116, which are generally configured or otherwise capable of transmitting and/or receiving communications to and/or from each other. The term remote in this context merely means that the remote computer 118 and the client device 113 are separate from each other. Thus, the devices may be remote even if the devices are located within the same room. As such, the client device 113 is preferably configured or otherwise capable of transmitting and/or receiving communications to and/or from the remote computer 118. This may be accomplished with a communication element 124, such as a modem, an Ethernet interface, a transmitter/receiver, etc., that enables communication with a similarly equipped remote computer 118, wirelessly, wired, or a combination thereof. It is understood that the relative functionality described herein may be provided by the remote computer 118, by the client device 113, or both, and is thus not limited to any one implementation discussed herein.

The client devices 113 may include, without limitation, a mobile phone, PDA, pocket PC, personal computer, as well as any special or general purpose client device, such as a cable TV box, a web TV box, etc. As such, the client device 113 preferably includes a processor 122, a memory 123, a display 125, such as a CRT or an LCD monitor, for displaying the media content provided by the system 100, and at least one input device, such as a mouse, a touch-sensitive pad, a pointer, a stylus, a trackball, a button, e.g., alphanumeric, a scroll wheel, a touch-sensitive monitor, etc., or a combination thereof, for users to enter commands and/or information relevant to the system's services. With the general purpose type client devices 113, such as the PC or PDA, users may access the services provided by the system 100, e.g., the remote computer 118, with a browser or any other generic application, or with special purpose software designed specifically for accessing and providing the services disclosed herein.

Figure 2:
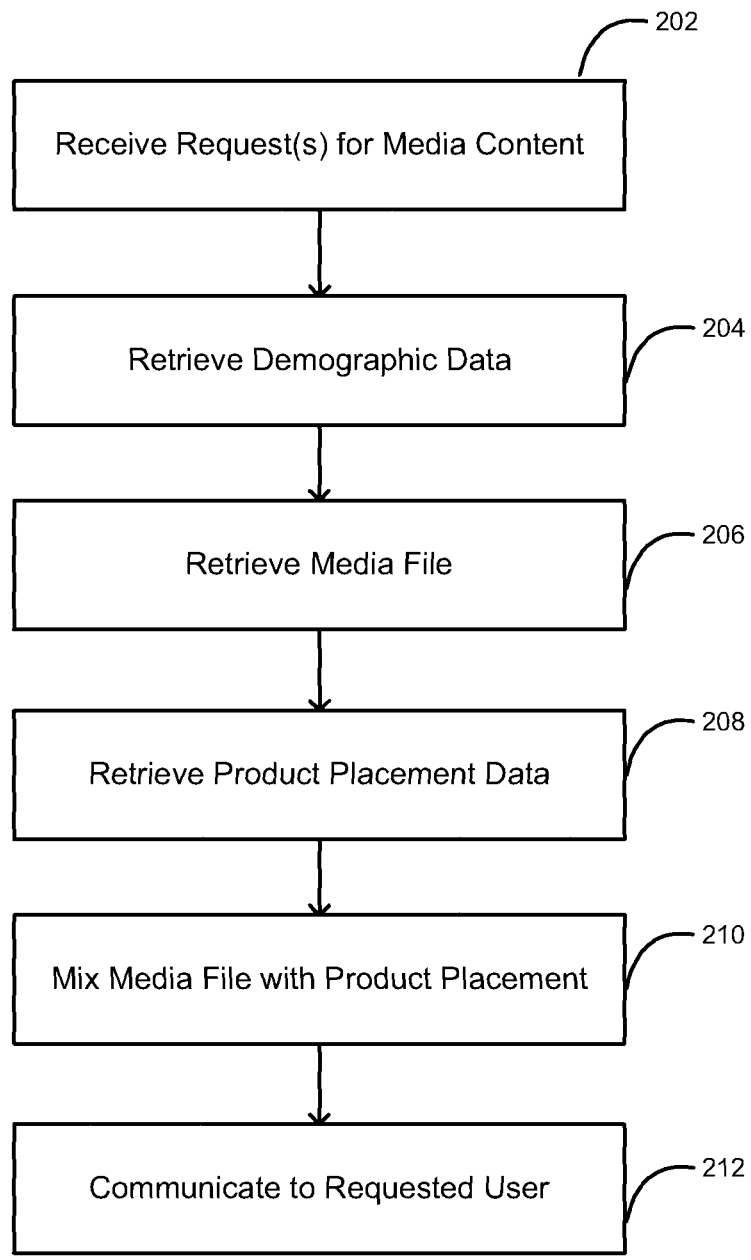
FIG. 2 depict a flow diagram according to at least one embodiment of the methods disclosed herein.

The systems generally create and distribute media content with product placements or other advertising disposed within the media content. The advertising is preferably disposed, as least with respect to media that is not a still image, e.g., video or audio, such that during play of the media content play is not interrupted for the adverting. It is understood that this may be accomplished in a variety of ways. Referring to FIG. 2, in one embodiment of the methods disclosed herein, this is accomplished with a receipt from a user at 202 for a request for media content. This may be accomplished various ways depending on the context of the request. For example, applied to the Internet, a user may submit the request to play media content, such as a video file, via a web browser. Various embodiments may be implemented over cable television, pay per view (e.g., pay per view television), digital video disc or digital versatile disc (DVD), etc. In various embodiments, the player (e.g., video player) or set top box is networked to a remote server that communicates product placement data to the player/set top box for insertion into the movie being played.

In response to the request, the system 100 preferably determines certain demographics regarding the requesting user. Demographics may be stored in a user profile, which preferably provide information relevant for advertising, such as the age of the request user, gender, interests, geographic location, etc. Demographic data may be stored and retrieved at 204 in a user profile either locally at the device 113 and/or the remote computer 118. The identity of the particular user may be confirmed with user login information and/or previously confirmed and stored data.

In response to the request, the system 100 retrieves a media file corresponding to the requested media content at 206. The system 100 preferably also retrieves product placement data at 208. The particular product placement data is preferably selected based on the demographic data of the particular user or generally for a group of users. That is, product placements are selected that are most relevant to the target. For example, beer may be targeted to males between 30 and 40 years of age whereas wine coolers may be targeted to females of the same age group.

The media file and product placement data is preferably mixed at 210 and communicated to the user at 212. Mixing may be accomplished in a variety of ways. In at least one embodiment, the system 100 mixes content with the product placement by using at least one media file that provides therein a null space for the product placement and at least one product data file. The null space may then be filled with some or all of the contents of the product data file, such a product image, a banner, watermark, etc., conformed to the null space or otherwise. The conformed product image may be placed within the null space in each instance of its appearance in the media file. The product image may be conformed, for example, by expanding or cropping the image to fit and/or fill the null space, rotating, panning, zooming in or out, transforming the image, skewing, tilting, etc., or a combination thereof. In at least one embodiment, the product data file comprises 3-D data for use in rendering the product image within the null space of the media file. It is understood that the media content will, in certain embodiments, be different for various users. For example, a film played for a user in one location may be rendered differently with different product placements therein for a second user.

A null space generally represents a defined area in the display or playback of the media file. The area may be defined by location and/or time of playback. For example, the null space in a still image may be defined by points and/or shapes in the still image. In a video file, the null space may similarly be defined as an area in a frame or frames of the video file, e.g., a number of consecutive frames sufficient to extend over a desired amount of playback time, e.g., 1, 2, 3, . . . , 30 seconds, etc. Therefore, the null space may be defined in a two dimensional space with an optional third dimension (time, frame, etc.). The null space definitions may be included in the media file or a separate data file.

For example, a null space may provide for the animated digital presentation of a rectangular shape with height, width, and depth dimensions, such as those for a box of cereal, within a streaming digital video stream. The null space can be created either through original animation, animation imposed on a background of animation or on a background consisting of a still or moving photographic image (film or digital source), or through the photography of a designated motion capture object within a still or moving photographic image (film or digital source). Once the null space is established within the media file, its space can then be populated with the content of a designated commercial product or any other visual reference. The term null space does not necessarily imply that the space is empty. Rather, the null space may contain a placeholder image that is a default in the event that there is no product placement for the null space.

A product image may therefore be retrieved from the data file and conformed to the null space in the media file. Thus, a particular cereal box product image represented in a data file may be accessed and rendered within the null space. The cereal box may be stationary within the media file, in which instance, rendering beyond initially inserting and/or conforming the image into the null space may not be necessary. If the cereal box does not remain stationary, for example, when an actor in the streaming or other video picks up the box, the product image may be transformed to follow the null space in the playback of the video file. Similarly, color, lighting, hue, contrast, etc., may be transformed to reflect movement within the space of the playback picture.

Pursuant to this concept, the intermediate as well as the final forms of the streaming digital media may be capable of alteration through the substitution of a first image for the container, a second image for the first image, and so on.

Insertion of objects into the null space may be governed by the authorized producer or media content provider. The authorized producer may control whether an object can be inserted into the container, whether the object's rights to the container have expired, whether a second object has acquired rights to the container, and so on. The authorized producer can grant rights to the container or cause such rights to cease at any time. Such rights may depend on the number of iterations of a media stream, or be calendar-based. Such rights can be sold and re-sold for any number of iterations or any time period. As can be appreciated, a media file may include a plurality of null spaces or containers. Thus, a data file may be maintained which controls use of the null space for advertising as noted above.

The authorized producer should have the capability to monitor the quality and duration of any object's occupancy of any container, and should have the capacity to measure whether the object resided in the container for the duration of its authorized rights, and whether the quality of the image within the container met or exceeded agreed thresholds for clarity and orientation of presentation during its rights period. In the event of any shortfall, such as the object failing to appear in the container for some portion of its authorized period, the image being of inadequate quality, or in the event of an overall interruption of the media stream such that the object failed to be presented for the full duration of its rights, data would indicate whether quantified measurement criteria have been attained or not attained, including the degree of failure or success.

Rights can be granted perpetually or serially. Access to the container may be governed by the authorized producer such that no image can be substituted without permission from the authorized producer. In this way, an object can be inserted into a portion of a stream, without the stream itself having to be reproduced or re-recorded.

One means by which the authorized producer may grant rights to the nulls space would be through the commercial sale of such rights. In this respect, play may be tracked and statistics based thereon may be used to sell the rights to insert product images in the media file. Revenue sharing may also be implemented based on play statistics. End user profiles may also be accessed to target specific products of interest to the end user.

In another embodiment, a stream or media file may be created with a null space that can be customized by an intermediate or ultimate viewer, who may choose to insert an image file into the null space to view the inserted image in the context of the media file. The viewer may be able to choose from a menu of available, provided and pre-configured still or moving image objects, or from user owned objects that may be configured and inserted into the container.

For example, a purchaser of apparel may view a moving image of a clothing model within a media stream, and choose among several available image files representing alternative garments that may be viewed on the model. In another embodiment a user may view a still or moving image file where the container represents a character space and insert an image file of available or owned likenesses.

Such intermediate or ultimate users may utilize the customization technology to assist purchase decisions, or may pay a per-use or subscription fee for the use of the technology to customize still or moving images.

In various embodiments, the size of an object container within a media file may vary based on the size of some other object appearing in the media file. The other object may be a person, tree, shelf, or any other object. In this way, for example, as the size of a tree grows or shrinks in a video (e.g., due to zooming in or zooming out), the object container would also grow or shrink. Thus, when a product is placed within the container, the product may appear to hold a fixed position within the scene, naturally appearing further away when the other object appears further away (e.g., is smaller) and naturally appearing closer when the other object appears closer.

In various embodiments, an object being advertised may also appear to rotate or change orientation as appropriate to the scene. For example, in a video, a truck may appear to drive by and to make a turn. A spot on the side of the truck may feature ad content. The ad content may appear to turn as the truck turns. For example, the viewing angle of the ad content may change from head-on to 45 degrees as the truck turns. Thus, in various embodiments, an object container may include orientation data. An advertising image may be transformed to conform to the orientation data. For example, an advertising image may be transformed so that it appears to a viewer as if it is viewed from an angle rather than head-on.

In various embodiments, an actual object may be placed or filed in a scene. For example, in a situation comedy, an actual portrait is placed on a wall during the filming of the situation comedy. However, this portrait may serve as a place holder or object container such that products can be inserted into the scene in place of the portrait. Since the portrait will naturally appear to hold its position in the scene, objects inserted in place of the portrait may also appear to hold their places in the scene. This image in the scene may also be the default as discussed herein.

In various embodiments, an image (e.g., a product image) may be inserted prior to transmitting the image to viewers. Thus, for example, content and ads may be combined at a server before being transmitted to viewers. The media file with the inserted product data may then be broadcast to a plurality of viewers or to a single requesting viewer. The insertion of an image may occur prior to or at the time of broadcast by the local cable company. In embodiments involving the Internet, the insertion of an image may occur prior to or on demand for the media file.

In various embodiments, a product placement may be inserted in the beginning, end, or anywhere in between during media file playback. The product placement may take up all or a portion of the playback image or audio portion of the media file. For example, the advertisement may be a voice over in a portion of playback.

In some embodiments involving the Internet, product images or data may be stored on a cache on a user device, such as on a user home computer. The cache may be accessed for the product before the image is downloaded from the remote server to a user device. The cache may also be accessed when the connection is lost. The product image may have an expiration date to prevent old images from being used. Also, some images may have an access weight greater than others. This way, images with high weight may be shown more frequently than those with lesser weight. The device may store play data and send the play data to the remote server for accounting. For example, a user's home computer may transmit to the remote server the number of times a particular product was inserted into a video played by the user. Advertising revenue may be derived on a per view model. Antifraud measures may also be implemented to prevent over billing. For example, number of plays per device may be determined and compared with average. Views from questionable sources may be cut or eliminated.

In various embodiments, ad revenue may be shared with the producer/owner of the rights to the media file on a per view basis. Therefore, owners may include multiple product images in a media file and derive revenue from the multiple views for the plurality of product images. Accounts may be set up for the producer and funds may be deposited therein automatically. The revenue per view may be split with the service provider. Price per view may vary based on playback time and/or location of image in media file. For example, spots in action packed scenes may be less as the product image may be less prominent. More prominent placements may cost more.

In various embodiments, a different video version may be shown to a user based on information about the user. For example, a user in Illinois may see a slightly different video than does someone in Florida. The difference may come down to product placement. For example, one version of a video may show a product popular in Illinois, while a different video from someone else may show a product popular in Florida. Of course, there can be many other user characteristics, such as age, IP address, income, gender, stated preferences, viewing history, and more that determine what ads are shown.

In various embodiments, an application programming interface (API) may be used for the process of inserting ads into image or video content. A producer of video content may specify certain parameters of an ad to be inserted. The parameters may detail image size, and the duration of the ad, for example. A producer of ads may then produce ads to these specifications. The API may then take care of the details of inserting the ads into the video content. The producer of video content and the producer of ads need never meet or interact. The reverse system may also occur. A marketer can make an ad with an API for plugging in content.

In various embodiments, an ad may take up a whole screen. For example, there is a five second pause in the main video content for the advertisement. In various embodiments, an advertiser be a "sponsor" and appear in the end credits to video content.

A system according to some embodiments may allow the makers of content to solicit bids for ads. The ad corresponding to the highest bid can be selected automatically and inserted. A market may thus be created for ads and for content.

Ads may be shown only a certain number of times. E.g., an advertiser may only bid for 100 showings.

Ads can be shown to people in a certain region, of a certain demographic, etc.

In various embodiments, an advertiser may have text shown in an image or video file. The text may be overlain on top of the image or video. The text may be placed in a corner, at the bottom of the screen, or in any other area. The use of text may make it easier for a content producer to make image or video content without the constant worry of where to leave space for an ad.

While the foregoing invention has been described in some detail for purposes of clarity and understanding, it will be appreciated by one skilled in the art, from a reading of the disclosure, that various changes in form and detail can be made without departing from the true scope of the invention in the appended claims.

What is claimed is:

1. A system comprising:
   at least one computer processor coupled over an electronic communication network to a plurality of other devices comprising a first device and a second device; and
   at least one memory having instructions stored thereon which, when executed by the at least one computing device, direct the at least one computer processor at least to:
   receive, via the electronic communication network, a request for media content from the first device;
   receive, via the electronic communication network, a request for the media content from the second device;
   retrieve a media file associated with the media content requested by the first and the second devices, wherein the media content comprises a first and second defined null space, the first and second defined null spaces at least partially overlapping in time during a playback of the media content;
   retrieve data for a first, second, third, and fourth product placement, in which the first, second, third, and fourth product placements are each associated with different products;
   mix, in response to the request from the first device, the media file and the data for the first and third product placements such that the first product placement appears in the media content disposed in at least a portion of the first defined null space and the third product placement appears in the media content disposed in at least a portion of the second defined null space;
   mix, in response to the request from the second device, the media file and data for the second and fourth product placement such that the second product placement appears in the media content disposed in at least a portion of the first defined null space and the fourth product placement appears in the media content disposed in at least a portion of the second defined null space;
   communicate, via the electronic communication network, the media content with the first product placement data to the first device;
   communicate, via the electronic communication network, the media content with the second product placement data to the second device; and
   receive, via the electronic communication network, from a cache of at least one of the first device and the second device, data representing number of times product placement appeared in the media content that was communicated to the at least one of the first device and the second device.

2. The system of claim 1, wherein the at least one computing device is further operable to mix the media file and the product placement data, and communicate the mixed content to users in real time.

3. The system of claim 1, wherein the at least one computing device is further operable to determine demographic data associated with at least one of a user of the first device and a user of the second device and select at least one of the first product placement and the second product placement based on the demographic data.

4. The system of claim 1, wherein at least one of the first product and the second product placements comprise a banner advertisement.

5. The system of claim 1, wherein the media content comprises a video and wherein the null space comprises at least one defined area of a plurality of frames of the video over a period of time.

6. The system of claim 5, wherein at least one of the first product and the second product placements comprise an image of a product.

7. The system of claim 6, wherein the at least one computing device is further operable to conform the image of the product to the null space.

8. The system of claim 6, wherein operability to conform the product to the null space comprises at least two of expanding, cropping, rotating, panning, zooming in or out, transforming the image, skewing and tilting the image.

9. The system of claim 6, wherein null space comprises a plurality of areas of a plurality of consecutive frames of the video and wherein the at least one computing device is further operable to conform the image of the product into each of the plurality of the areas to simulate movement of the product in the media content.

10. The system of claim 1, wherein the media file comprises a default image in the null space.

11. The system of claim 1,
   in which the act of communicating the media content with the first product placement data to the first device comprises causing the media content with the first product placement data to be displayed at a first display device;

in which the act of communicating the media content with the second product placement data to the second device comprises causing the media content with the second product placement data to be displayed at a second display device; and in which the instructions, when executed by the processor, further direct the processor to:

monitor a duration of playback of the first product placement data during a playback of the media content at the first display device;

monitor a duration of playback of the second product placement data during a playback of the media content at the second display device;

determine whether the monitored duration of playback of the first product placement data meets a first predetermined threshold; and determine whether the monitored duration of playback of the second product placement data meets a second predetermined threshold.

12. The system of claim 1, in which the instructions, when executed by the at least one computing device, further directs the at least one computing device to:

determine a first, second, third, and fourth fee to be respectively charged to a respective first, second, third, and fourth advertiser associated with the respective first, second, third, and fourth product placement respectively based on a respective time of playback of the first, second, third, and fourth product placements, respectively.

13. The system of claim 1, in which the first defined null space is comprised in a first location associated with the media content and the second defined null space is associated with a second location of the media content, and in which the instructions, when executed by the at least one computing device, further directs the at least one computing device to:

determine a first, second, third, and fourth fee to be respectively charged to a respective first, second, third, and fourth advertiser associated with the respective first, second, third, and fourth product placement respectively based on a respective location of playback of the first, second, third, and fourth product placements, respectively.

14. The system of claim 1, in which the instructions, when executed by the at least one computing device, further direct the at least one computing device to:

cause the first, second, third, and fourth product placements to be sold to a first, second, third, and fourth advertiser, respectively.

15. A method comprising:

receiving, by at least one computer processor coupled over an electronic communication network to a plurality of devices comprising a first device and a second device, a request for media content from a first device;

receiving, by the at least one computer processor via the electronic communication network, a request for the media content from a second device;

retrieving, by the at least one computer processor, a media file associated with the media content requested by the first and the second devices, wherein the media content comprises a defined first and second null space, the first and second defined null spaces at least partially overlapping in time during a playback of the media content;

retrieving, by the at least one computer processor, data for a first, second, third, and fourth product placement;

mixing, by the at least one computer processor, in response to the request from the first device, the media file and the data for the first and third product placement such that the first product placement appears in the media content disposed in at least a portion of the defined first null space and the third product placement appears in the media content disposed in at least a portion of the second defined null space;

mixing, by the at least one computer processor, in response to the request from the second device, the media file and data for the second product placement such that the second product placement appears in the media content disposed in at least a portion of the first defined null space and the fourth product placement appears in the media content disposed in at least a portion of the second defined null space;

communicating, by the at least one computer processor via the electronic communication network, the media content with the first product placement data to the first device;

communicating, by the at least one computer processor via the electronic communication network, the media content with the second product placement data to the second device; and receiving, via the electronic communication network, from a cache of at least one of the first device and the second device, data representing number of times product placement appeared in the media content that was communicated to the at least one of the first device and the second device.

16. The method of claim 15, wherein media file and the product placement data are mixed and communicated to users in real time.

17. The method of claim 15, comprising determining demographic data associated with at least one of a user of the first device and a user of the second device and selecting at least one of the first product placement and the second product placement based on the demographic data.

18. The method of claim 15, wherein at least one of the first product and the second product placements comprise a banner advertisement, and wherein the media file comprises a default image in the null space.

19. The method of claim 15, wherein the media content comprises a video and wherein the null space comprises at least one defined area of a plurality of frames of the video over a period of time.

20. The method of claim 19, wherein at least one of the first product and the second product placements comprise an image of a product.

21. The method of claim 20, comprising conforming the image of the product to the null space.

22. The method of claim 20, wherein conforming the product to the null space comprises at least two of: expanding, cropping, rotating, panning, zooming in or out, transforming the image, skewing and tilting the image.

23. The method of claim 20, wherein null space comprises a plurality of areas of a plurality of consecutive frames of the video, the method comprising conforming the image of the product into each of the plurality of the areas to simulate movement of the product in the media content.

24. A non-transitory computer-readable medium having instructions stored thereon that are configured to, when executed by at least one processor of at least one computer coupled over an electronic communication network to a plurality of networked devices, direct the at least one processor to:

receive, via the electronic communication network, a request for media content from a first device;

receive, via the electronic communication network, a request for the media content from a second device;

retrieve a media file associated with the media content requested by the first and the second devices, wherein the media content comprises a first and second defined null space, the first and second defined null spaces at least partially overlapping in time during a playback of the media content;

retrieve data for a first, second, third, and fourth product placement, in which the first, second, third, and fourth product placements are each associated with different products;

mix, in response to the request from the first device, the media file and the data for the first and third product placements such that the first product placement appears in the media content disposed in at least a portion of the first defined null space and the third product placement appears in the media content disposed in at least a portion of the second defined null space;

mix, in response to the request from the second device, the media file and data for the second and fourth product placement such that the second product placement appears in the media content disposed in at least a portion of the first defined null space and the fourth product placement appears in the media content disposed in at least a portion of the second defined null space;

communicate, via the electronic communication network, the media content with the first product placement data to the first device;

communicate, via the electronic communication network, the media content with the second product placement data to the second device; and receive, via the electronic communication network, from a cache of at least one of the first device and the second device, data representing number of times product placement appeared in the media content that was communicated to the at least one of the first device and the second device.

\* \* \* \* \*